I. DI FABIO.
BICYCLE.
APPLICATION FILED MAR. 6, 1909.
924,438.
Patented June 8, 1909.
2 SHEETS—SHEET 2.
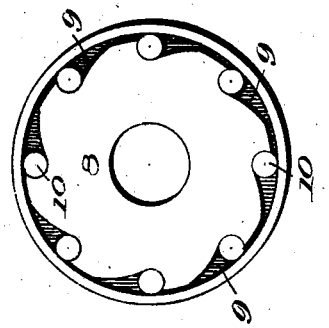
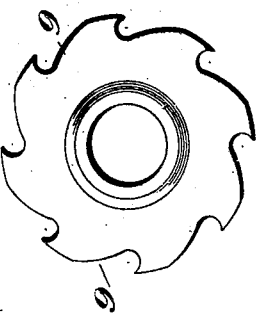
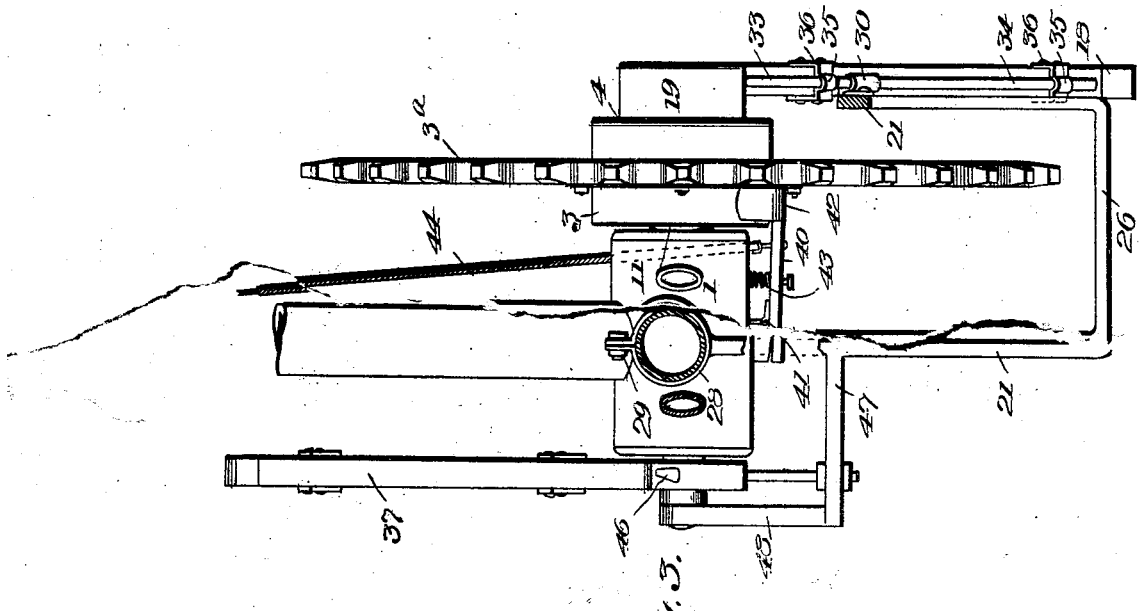
WITNESSES
F. C. Barry
C. E. Tramer
INVENTOR
ITALO DI FABIO
BY Murray Co.
ATTORNEYS

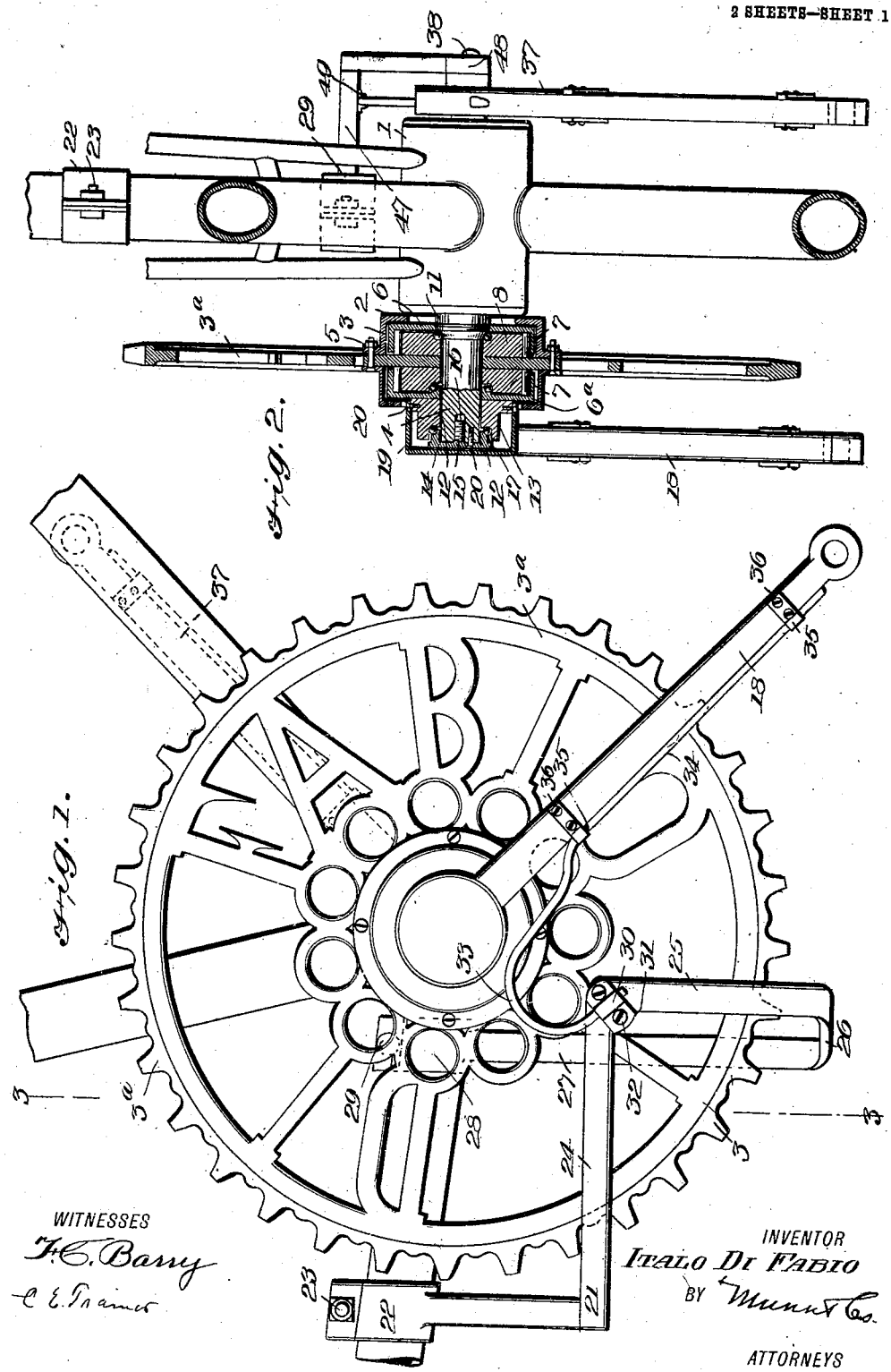

UNITED STATES PATENT OFFICE.

ITALO DI FABIO, OF PHILADELPHIA, PENNSYLVANIA.

BICYCLE.

No. 924,438.  Specification of Letters Patent.  Patented June 8, 1909.

Application filed March 6, 1909. Serial No. 481,618.

*To all whom it may concern:*

Be it known that I, ITALO DI FABIO, a subject of the King of Italy, residing at Philadelphia, in the county of Philadelphia, State of Pennsylvania, United States of America, have invented an Improvement in Bicycles, of which the following is a specification.

My invention is an improvement in bicycles, and consists in certain novel constructions and combinations of parts as will be hereinafter described and claimed.

The object of the invention is to provide a driving mechanism actuated by oscillating pedals.

Referring to the drawings forming a part hereof—Figure 1 is a side view of a portion of the driving mechanism of a bicycle constructed in accordance with the improvement. Fig. 2 is a front view partly in section. Fig. 3 is a section on the line 3—3 of Fig. 1. Fig. 4 is a plan view of the clutch, and Fig. 5 is a similar view of a portion of the same.

In the present embodiment of my invention, the crank case 1 is of the usual construction, and the driving shaft 2 is journaled therein in the usual manner. The sprocket wheel 3ª is journaled on the reduced end 4 of the crank shaft, and has connected therewith a two-part substantially cylindrical casing, the parts 3—4 being secured to the sprocket wheel by bolts 5, which traverse annular flanges on the sections and the sprocket wheel. Upon each side of the sprocket wheel is a disk 6, 6ª, having an internal annular flange 7, the disk 6 being threaded on to the crank shaft, while the disk 6ª is loosely journaled thereon.

Secured to each side of the sprocket wheel, within the flange of the adjacent disk, is a clutch wheel 8, the periphery of which wheel is provided with notches 9 within which are received rollers 10. Each of the notches, as will be evident from an inspection of Figs. 4 and 5, is deepest at its front end, so that when the wheels are moved forwardly with respect to the disks, the rollers will move into the shallow part of the notch thus clutching the wheels to the rims. A ball bearing 11 is arranged between the crank shaft and the disk on the inner side of the sprocket wheel, while a ball bearing 12 is arranged between the outer wheel and the adjacent disk. A hub 13 encircles the crank shaft adjacent the disk 6ª and is secured thereto in any suitable manner, while a nut 14 incloses the tip of the shaft, the said nut being provided with a threaded stem 15 engaging an opening 16 in the end of the shaft whereby to secure the nut thereto, and a ball bearing 17 is arranged between the inner end of the nut and the hub, as shown in Fig. 2. The crank 18 is provided with an integral cap 19 which is secured to the hub by means of screws 20, whereby to constrain the hub to move with the crank. A screw 20 traverses the nut and engages the end of the shaft whereby to secure the nut in its adjusted position. It will be evident from the description that when the crank 18 is moved forwardly the disk 6ª will clutch the adjacent wheel, while, when the crank 37 is moved forwardly the disk 6 which is secured to the crank shaft will clutch the adjacent wheel and the disk 6ª will be released. It will be understood that the crank 37 is secured to the crank shaft by a key 46, in the usual manner.

A bracket 21 is provided with a split bearing 22 which is secured to a lower member of the frame by a bolt 23, and the bracket extends downwardly and forwardly as at 24, thence downwardly again as at 25 transversely of the wheel as at 26 and upwardly as at 27, the free end being provided with another split bearing 28 secured to the same member as the bearing 22 by a bolt 29. At the corner 30 of the bracket a bearing 31 is secured thereto by screws 32, and one end of a spring 33 is secured in place by the bearing, the other end of the spring extending beneath the crank as at 34, to a point adjacent the pedal, said spring being secured in place by bearings 35 secured to the crank by screws 36.

In Fig. 3 is shown a brake comprising a lever 40 hinged by one end as at 41 to the frame, and provided at the other with a shoe 42 for engaging the hub casing 3 of the sprocket, and the lever is normally retained in inoperative position by a spring 43. A flexible cable or the like 44 is connected to the lever as at 45 by one end, and the other extends to a point adjacent the handle bars.

The portion 21 of the bracket is provided with a lateral projection 47 connected by an integral arm 48 with the end of the crank shaft, the connection being made by a pin 38 arranged axial of the shaft and upon which the shaft is rotatable.

A bearing 49 is provided for the spring 33 which returns the crank 37, and the spring is secured to the crank in the same manner as described for the crank 18.

I claim:

1. In a bicycle, the combination with the frame and the crank case, of a crank shaft journaled thereon, a sprocket wheel journaled on one end of the shaft, a hub journaled on the shaft outside of the sprocket wheel, a disk secured to the hub, and provided with a lateral annular flange extending toward the sprocket wheel, a disk secured to the shaft on the opposite side of the sprocket wheel and having a lateral flange extending toward the wheel, a clutch wheel secured to each side of the sprocket wheel and lying within the flange of the adjacent disk, a clutch connection between each of the wheels and the adjacent rim, a crank secured to the hub, and springs for returning the cranks.

2. A device of the class described, a crank shaft a sprocket wheel journaled on the shaft, a clutch wheel secured to each side of the sprocket wheel, a disk adjacent to each clutch wheel and provided with a lateral flange overlying the wheel, a clutch connection between each wheel and the adjacent rim, a crank connected with one disk, the other being secured to the shaft, and a crank connected with the shaft.

3. In a device of the class described, the combination with the oscillatable cranks, of a bracket, comprising a loop for receiving the sprocket wheel, and arms provided with split bearings for engaging the frame, a spring having one end secured to the bracket and the other lying alongside the adjacent crank, and bearings engaging the spring and secured to the crank.

ITALO DI FABIO.

Witnesses:
 TOBIA LOSEO,
 ERNESTO MASTROGIOVANNI.